US009889745B2

(12) United States Patent
Sakaguchi et al.

(10) Patent No.: US 9,889,745 B2
(45) Date of Patent: Feb. 13, 2018

(54) SLIP DETERMINATION SYSTEM FOR VEHICLE

(71) Applicant: HONDA MOTOR CO., LTD., Tokyo (JP)

(72) Inventors: Yusuke Sakaguchi, Wako (JP); Satoshi Ando, Wako (JP); Masatoshi Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/105,300

(22) PCT Filed: Dec. 16, 2014

(86) PCT No.: PCT/JP2014/083249
§ 371 (c)(1),
(2) Date: Jun. 16, 2016

(87) PCT Pub. No.: WO2015/093473
PCT Pub. Date: Jun. 25, 2015

(65) Prior Publication Data
US 2016/0318400 A1 Nov. 3, 2016

(30) Foreign Application Priority Data
Dec. 17, 2013 (JP) ................. 2013-260397

(51) Int. Cl.
B60L 3/10 (2006.01)
B60K 6/44 (2007.10)
(Continued)

(52) U.S. Cl.
CPC ............... B60L 3/102 (2013.01); B60K 6/44 (2013.01); B60K 6/52 (2013.01); B60K 6/547 (2013.01);
(Continued)

(58) Field of Classification Search
CPC .......... B60L 3/102; B60L 7/10; B60L 3/0023; B60L 3/00; B60L 15/20; B60L 15/2009;
(Continued)

(56) References Cited

U.S. PATENT DOCUMENTS

2012/0130581 A1 5/2012 Semsey et al.
2014/0229048 A1 8/2014 Kawata et al.
2014/0288752 A1 9/2014 Makino

FOREIGN PATENT DOCUMENTS

EP 2 612 796 A1 7/2013
JP 10-304509 A 11/1998
(Continued)

OTHER PUBLICATIONS

International Search Report dated Mar. 17, 2015, issued in counterpert International Application No. PCT/JP2014/083249, with English translation (4 pages).
(Continued)

Primary Examiner — Brian P Sweeney
(74) Attorney, Agent, or Firm — Westerman, Hattori, Daniels & Adrian, LLP

(57) ABSTRACT

A slip determination system for a vehicle, which is capable of improving the determination accuracy by avoiding erroneous determination of excessive slip of wheels when a state of the wheels, driven/braked by motors, is switched. In the slip determination system according to the present invention, when first and second motor rotational speeds NMOT1 and NMOT2, which are rotational speeds of rear motors which brake/drive rear wheels WRL and WRR, reach a reference rotational speed NMREF set based on wheel rotational speeds NWFL, NWFR, NWRL, and NWRR, it is determined that excessive slip has occurred in the rear wheels WRL and WRR. When the sign of a target torque TROBJ of the rear motors is inverted, the reference rotational speed NMREF is changed to a value more difficult to (Continued)

be reached by the first and second motor rotational speeds NMOT1 and NMOT2, or the excessive slip determination is inhibited.

2 Claims, 12 Drawing Sheets

(51) Int. Cl.
| | | |
|---|---|---|
| *B60K 6/52* | (2007.10) | |
| *B60K 6/547* | (2007.10) | |
| *B60L 3/00* | (2006.01) | |
| *B60T 8/1761* | (2006.01) | |
| *B60W 40/10* | (2012.01) | |
| *B60L 7/10* | (2006.01) | |
| *B60L 15/20* | (2006.01) | |

(52) U.S. Cl.
CPC ............ *B60L 3/0023* (2013.01); *B60L 3/108* (2013.01); *B60L 7/10* (2013.01); *B60L 15/2009* (2013.01); *B60T 8/1761* (2013.01); *B60T 8/17616* (2013.01); *B60W 40/10* (2013.01); *Y02T 10/7258* (2013.01)

(58) Field of Classification Search
CPC .... B60L 3/108; B60T 8/17616; B60T 8/1761; B60K 6/547; B60K 6/52; B60K 6/44; B60W 40/10; Y02T 10/7258
USPC .......................................................... 701/22
See application file for complete search history.

(56) References Cited

FOREIGN PATENT DOCUMENTS

| | | | |
|---|---|---|---|
| JP | 2002-34106 A | | 1/2002 |
| JP | 2002034106 A | * | 1/2002 |
| JP | 2013-106390 A | | 5/2013 |
| JP | 2013106390 A | * | 5/2013 |
| JP | 2013-154729 A | | 8/2013 |
| JP | 5362792 B2 | | 12/2013 |
| WO | 2013/030923 A1 | | 3/2013 |

OTHER PUBLICATIONS

European Search Report dated Jul. 18, 2017, issued in counterpart application No. 14870995.9. (8 pages).

\* cited by examiner

SLIP DETERMINATION SYSTEM FOR VEHICLE

TECHNICAL FIELD

The present invention relates to a slip determination system for a vehicle, for determining occurrence of excessive slip in a wheel driven or braked by a motor capable of generating electric power.

BACKGROUND ART

Conventionally, as a control system for a vehicle having wheels driven or braked by a motor capable of generating electric power, there has been known one disclosed e.g. in PTL 1. This control system is applied to an electric vehicle that brakes and drives wheels using an electric motor. In this control system, a positive (driving side) or negative (braking side) target torque of the motor is calculated based on a detected accelerator pedal opening and a rotational speed of the motor, and further, delay processing is performed on the target torque to thereby calculate a positive or negative command torque to be output to the motor.

Then, when the sign of the calculated command torque is switched from one of positive and negative to the other, the command torque output to the motor is set to 0 for a predetermined time period thereafter. This prevents occurrence of a torque shock caused by backlash clogging occurring in a motive power transmission system between the wheels and the motor, when a state of the wheels driven/braked by the motor is switched, and thereby improves drivability.

CITATION LIST

Patent Literature

[PTL 1] Japanese Laid-Open Patent Publication (Kokai) No. H10-304509

SUMMARY OF INVENTION

Technical Problem

However, in the above-described conventional control system, when the state of the wheels driven/braked by the motor is switched, the command torque output to the motor is held at 0 for the predetermined time period, which prevents the torque of the motor from being transmitted to the wheels, and hence it is impossible to sufficiently exhibit responsiveness of the motor, which may have adversely affect the drivability.

Further, when the state of the wheels driven/braked by the motor is switched, mechanical connection between the motor and the wheels is released until the above-mentioned backlash clogging is eliminated, so that the rotational speeds of the motor and the wheels are temporarily fluctuated. Therefore, for example, in a case where excessive slip in the wheels is determined by comparing the rotational speed of the motor or the wheels with the threshold value, if the changed rotational speed of the motor or the wheels reaches the threshold value, it may be erroneously determined that excessive slip has occurred even though excessive slip has not actually occurred in the wheels.

The present invention has been made to provide a solution to the above-described problems, and an object thereof is to provide a slip determination system for a vehicle, which is capable of improving the accuracy of excessive slip determination by avoiding erroneous determination of excessive slip in a wheel when the state of the wheel driven/braked by a motor is switched.

Solution to Problem

To attain the above object, the invention according to claim 1 is a slip determination system for a vehicle (hybrid vehicle V), for determining whether or not excessive slip which is slip not smaller than a predetermined one occurs in a wheel (left rear wheel WRL, right rear wheel WRR) Which is mechanically connected to a motor (first rear motor 41, second rear motor 61 in an embodiment (the same applies to the following)), and is driven or braked by the motor, comprising wheel speed parameter-acquiring means (first motor rotational speed sensor 102$a$, second motor rotational speed sensor 102$b$) for acquiring a wheel speed parameter (first motor rotational speed NMOT1, second motor rotational speed NMOT2) indicative of a speed of one of the wheel and the motor, basic speed parameter-acquiring means (wheel rotational speed sensors 101$a$ to 101$d$) for acquiring a basic speed parameter (wheel rotational speed NWFL, NWFR, NWRL, NWRR) indicative of at least one of a speed of the vehicle and a speed of other wheel which is different from the wheel, threshold value-setting means (ECU 2, steps 25 and 26 in FIG. 8) for setting a threshold value (reference rotational speed NMREF) which serves as a reference for determination of the excessive slip, based on the acquired basic speed parameter, slip determining means (ECU 2, FIG. 9) for determining that the excessive slip has occurred in the wheel when the acquired wheel speed parameter reaches the set threshold value, braking/driving force-acquiring means (ECU 2, step 11 in FIG. 7) for acquiring a braking/driving force (target torque TROBJ of first and second rear motors 41, 61) of the motor for driving or braking the wheel, and threshold value-changing means (ECU 2, steps 28 and 29 in FIG. 8) for changing the threshold value to a second threshold value which is used at the time of an inversion of the braking/driving force, and which is more difficult to be reached by the wheel speed parameter than the threshold value, when the sign of the acquired braking driving force of the motor is inverted.

In this vehicle, the motor is mechanically connected to the wheel, and the wheel is driven or braked (braked/driven) by powering operation or regeneration operation performed by the motor. In this slip determination system, the wheel speed parameter indicative of a speed of at least one of the wheel and the motor is acquired. Further, the basic speed parameter indicative of one of the vehicle speed and the speed of other wheel which is different from the wheel (wheel which is not connected to the motor) is acquired, and the threshold value serving as the reference for determination of excessive slip which is slip in the wheel, not smaller than the predetermined one, is set based on the acquired basic speed parameter. Then, when the wheel speed parameter acquired as above reaches the threshold value, it is determined that excessive slip has occurred in the wheel.

Note that in the description and claims of the present application, the term "slip" of a wheel refers to a phenomenon that grip between a wheel and a road surface is lost, causing a rotational movement distance over which an outer periphery of the wheel moves by rotation not to coincide with a distance over which the vehicle moves, and includes both of racing and sliding of a wheel. The term "racing" of a wheel refers to a phenomenon that a wheel freely rotates with respect to a road surface, and for example, even when the wheel rotates one rotation, the vehicle advances by a distance shorter than a distance corresponding to one rotation of the wheel. Further, the term "sliding" of a Wheel refers to a phenomenon that e.g. When the vehicle is braked, the Wheel is locked and slid on a road surface e.g. due to reduction of frictional resistance between the wheel and the road surface.

Further, according to the present invention, the braking/driving force of the motor is acquired, and when the sign of the acquired braking/driving force of the motor is inverted, i.e. when the state of the wheel driven/braked by the motor is switched, the above-mentioned threshold value is changed to the second threshold value which is used at the time of an inversion of the braking/driving force, and which is more difficult to be reached by the wheel speed parameter than the threshold value. As a consequence, even when the speeds of the wheel and the motor are temporarily changed due to backlash clogging occurring in the motive power transmission system between the motor and the wheel when the state of the wheel driven/braked by the motor is switched, the wheel speed parameter becomes difficult to reach the changed second threshold value, whereby it is possible to avoid erroneous determination of excessive slip, and thereby improve the accuracy of excessive slip determination.

To attain the above object, the invention according to claim 2 is a slip determination system for a vehicle (hybrid vehicle V), for determining whether or not excessive slip which is slip not smaller than a predetermined one occurs in a wheel (left rear wheel WRL, right rear wheel WRR) which is mechanically connected to a motor (first rear motor 41, second rear motor 61 in an embodiment (the same applies to the following)), and is driven or braked by the motor, comprising wheel speed parameter-acquiring means (first motor rotational speed sensor 102a, second motor rotational speed sensor 102b) for acquiring a wheel speed parameter (first motor rotational speed NMOT1, second motor rotational speed NMOT2) indicative of a speed of one of the wheel and the motor, basic speed parameter-acquiring means (wheel rotational speed sensor 101a to 101d) for acquiring a basic speed parameter (wheel rotational speed NWFL, NWFR, NWRL, NWRR) indicative of at least one of a speed of the vehicle and a speed of other wheel which is different from the wheel, threshold value-setting means (ECU 2, steps 25 and 26 in FIG. 11) for setting a threshold value (reference rotational speed NMREF) which serves as a reference for determination of the excessive slip, based on the acquired basic speed parameter, slip determining means (ECU 2, steps 32 to 43 in FIG. 12) for determining that the excessive slip has occurred in the wheel when the acquired wheel speed parameter reaches the set threshold value, braking/driving force-acquiring means (ECU 2, step 11 in FIG. 7) for acquiring a braking/driving force (target torque TROBJ of first and second rear motors 41, 61) of the motor for driving or braking the wheel, and determination inhibiting means (ECU 2, step 51 in FIG. 12) for inhibiting the determination of the excessive slip performed by the slip determining means when the sign of the acquired braking/driving force of the motor is inverted.

The vehicle and the slip determination system in the present invention are the same in basic arrangement as those of the above-described invention according to claim 1. That is, in this vehicle, the wheel is mechanically connected to the motor, and is driven or braked (braked/driven) by powering operation or regeneration operation of the motor. In the slip determination system, the wheel speed parameter indicative of a speed of one of the wheel and the motor is acquired. Further, the basic speed parameter indicative of at least one of the vehicle speed and the speed of the other wheel which is different from the wheel (wheel which is not connected to the motor) is acquired, and the threshold value serving as the reference for determination of excessive slip which is slip in the wheel, not smaller than a predetermined one, is set based on the acquired basic speed parameter. Then, when the wheel speed parameter acquired as above reaches the threshold value, it is determined that excessive slip has occurred in the wheel.

Further, according to the present invention, the braking/driving force of the motor is acquired, and when the sign of the acquired braking/driving force of the motor is inverted, excessive slip determination is inhibited. This makes it possible to positively avoid erroneous determination caused by the threshold value being reached by the temporarily changed wheel speed parameter, due to backlash clogging occurring in the motive power transmission system between the motor and the wheel, whereby it is possible to improve the accuracy of the excessive slip determination.

DESCRIPTION OF EMBODIMENTS

Figure 1:
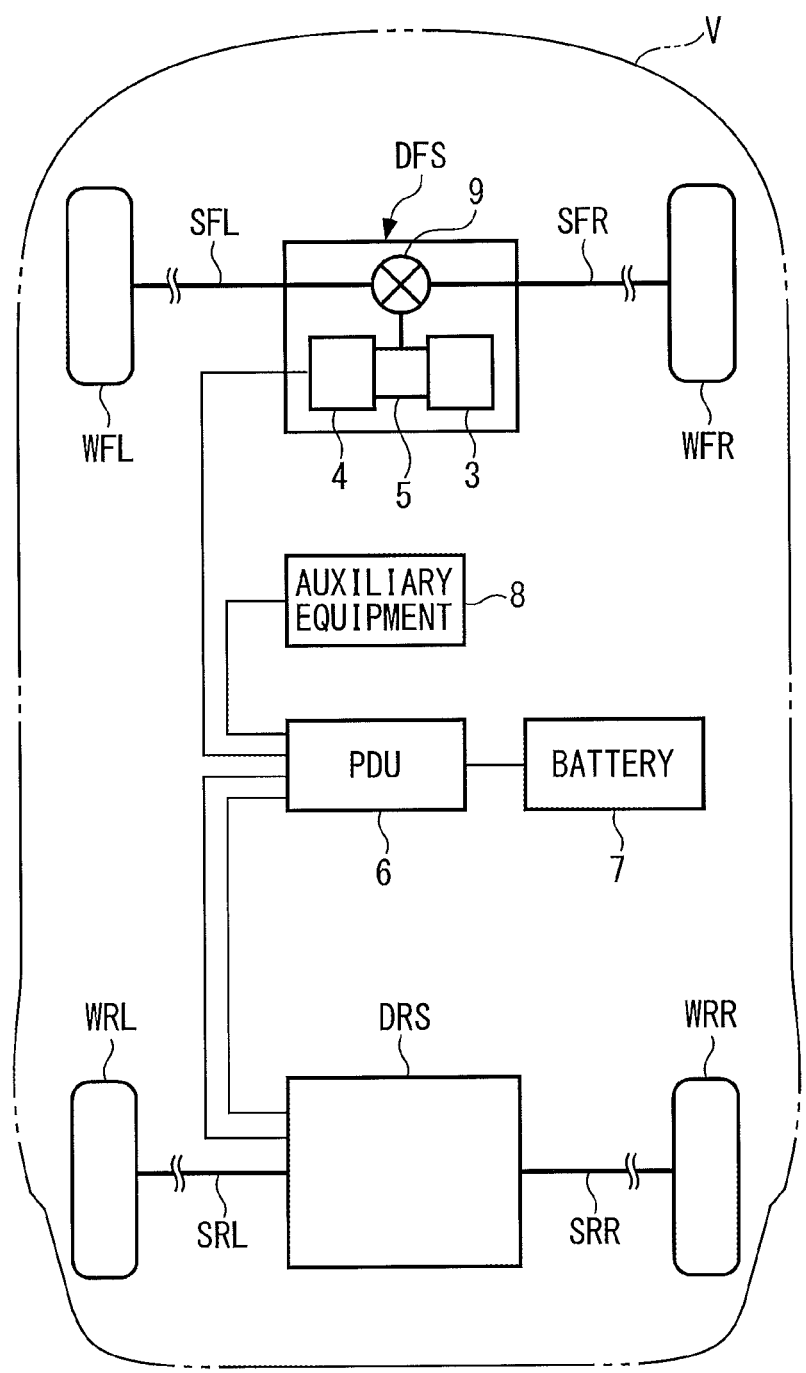
FIG. 1 A diagram schematically showing a vehicle to which a slip determination system according to embodiments is applied.

The invention will now be described in detail with reference to drawings showing preferred embodiments thereof. A hybrid vehicle (hereinafter simply referred to as the "vehicle") V shown in FIG. 1 is a four-wheel vehicle having four wheels W (left and right front wheels WFL and WFR, and left and right rear wheels WRL and WRR). The vehicle V is equipped with a front wheel-driving device DFS for driving the front wheels WFL and WFR and a rear wheel-driving device DRS for driving the rear wheels WRL and WRR.

The front wheel-driving device DFS is the same as that disclosed in e.g. Japanese Patent No. 5362792 proposed by the present applicant, and hence, hereafter, a brief description will be given of the construction and operation of the front wheel-driving device DFS. The front wheel-driving device DFS includes an internal combustion engine (hereinafter referred to as the "engine") 3 as a motive power source, a front motor 4 formed by a motor capable of generating electric power, and a transmission 5 which transmits motive power from the engine 3 and the front motor 4 to the front wheels WFL and WFR while changing the speed thereof.

The engine 3 is e.g. a gasoline engine, and an intake air amount, a fuel injection amount, and an ignition timing of the engine 3 are controlled by an ECU 2 (see FIG. 3), described hereinafter, whereby the motive power from the engine 3 is controlled.

The front motor 4 is formed e.g. by a brushless DC motor, and includes a stator and a rotor (neither of which is shown). The stator is electrically connected to a chargeable and dischargeable battery 7 via a power drive unit (hereinafter referred to as the "PDU") 6. The PDU 6 is formed by an electric circuit, such as an inverter, and is controlled by the ECU 2 to thereby control the operation of the front motor 4.

More specifically, when the ECU 2 controls the PDU 6 to supply electric power from the battery 7 to the stator of the front motor 4, the electric power is converted to motive power to thereby rotate the rotor (powering operation). Further, in a state in which the supply of electric power to the stator is stopped and the rotor is rotated by the input of motive power, the motive power is converted to electric power to thereby generate electric power (regenerative operation). The generated electric power is charged to the battery 7, or is supplied to first and second rear motors 41 and 61, described hereinafter, of the rear wheel-driving device DRS so as to be used to drive the rear wheels WRL and WRR.

Further, the vehicle V is equipped with auxiliary equipment 8 formed e.g. by a compressor of an air conditioner, and a 12 V battery (not shown). The auxiliary equipment 8 is electrically connected to the battery 7 via the PDU 6, and the 12 V battery is electrically connected to the battery 7 via a DC/DC converter (not shown).

The transmission 5 is formed by a so-called dual clutch transmission (DCT). Although not shown, the transmission 5 includes a first input shaft connected to the engine 3 via a first clutch, a planetary gear unit provided between the front motor 4 and the first input shaft, a second input shaft connected to the engine 3 via a second clutch, an output shaft arranged in parallel with the first and second input shafts, a plurality of input gears which are rotatably provided on the first and second input shafts, a plurality of output gears which are integrally formed with the output shaft, and are meshed with the plurality of input gears, a synchronization device that selectively connects one of the plurality of input gears to the first or second input shaft to thereby set a gear position determined by the selected input gear and the output gear meshed with the selected input gear, and so forth.

With the above arrangement, the first and second Clutches, the synchronization device, and so forth are controlled by the ECU 2, whereby input of motive power output from the engine 3 and/or motive power output from the front motor 4 to the first input shaft or input of the motive power output from the engine 3 to the second input shaft is selectively performed. The input motive power is output to the output shaft in a state in which the speed thereof is changed at a predetermined transmission ratio according to the gear position set by the synchronization device, and is further transmitted to the left and right front wheels WFL and WFR via a differential 9 and left and right front drive shafts SFL and SFR.

Figure 2:
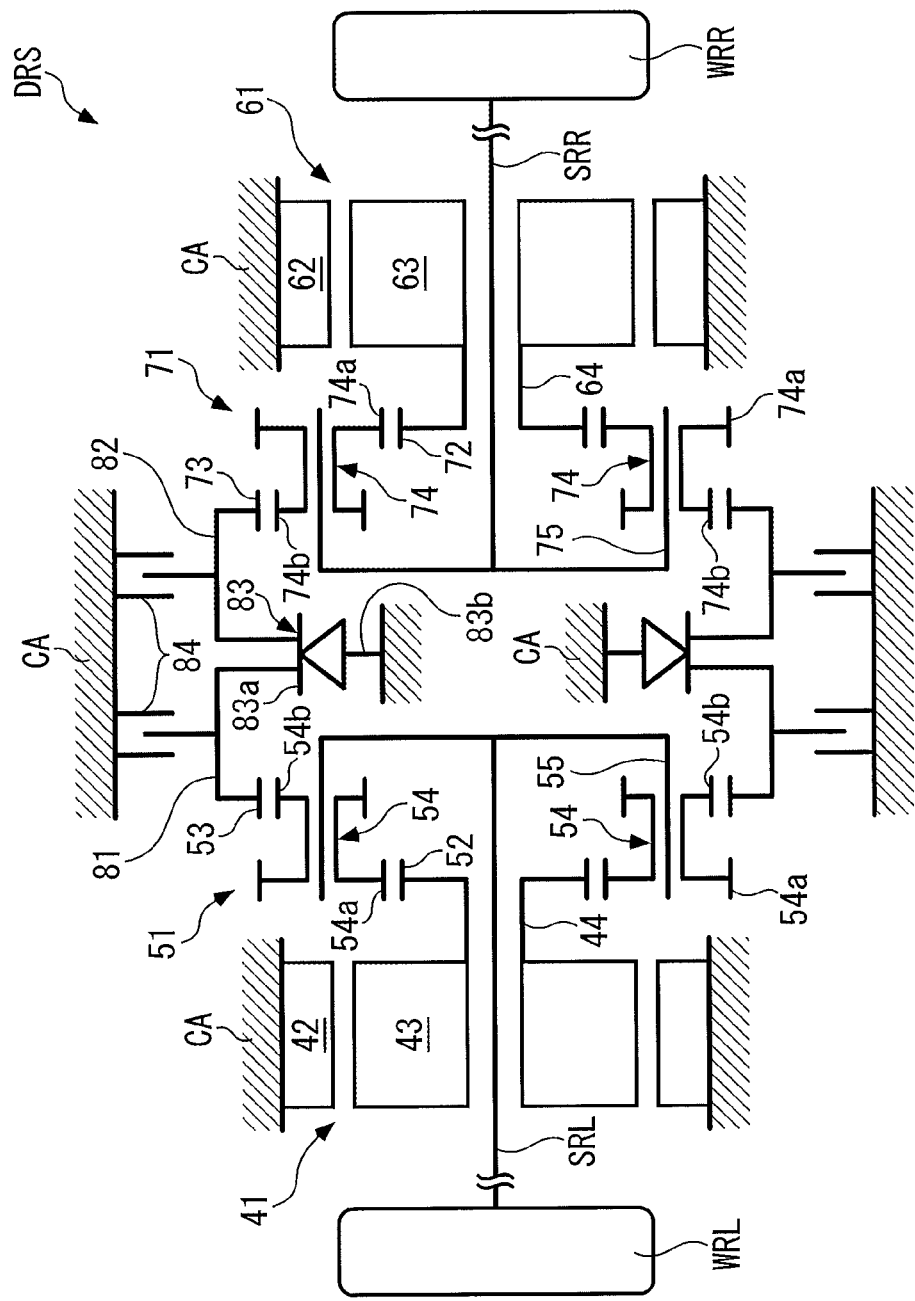
FIG. 2 A skeleton diagram schematically showing a rear wheel-driving device.

As shown in FIG. 2, the rear wheel-driving device DRS includes the first rear motor 41, a first planetary gear unit 51, the second rear motor 61, and a second planetary gear unit 71. These component elements are arranged between the left and right rear wheels WRL and WRR in the order of 41, 51, 71, and 61, and are provided coaxially with left and right rear drive shafts SRL and SRR. One ends of the rear drive shafts SRL and SRR are connected to the left and right rear wheels WRL and WRR, respectively.

The first rear motor 41 is, similarly to the front motor 4, a brushless DC motor formed by a motor capable of generating electric power, and includes a stator 42 and a rotor 43 which is rotatable. The stator 42 is fixed to a casing CA, and is electrically connected to the stator of the front motor 4 and the battery 7 via the PDU 6. The rotor 43 is integrally formed with a rotating shaft 44 which is hollow, and the rotating shaft 44 is relatively rotatably provided outside a left rear drive shaft SRL.

In the first rear motor 41, when the ECU 2 controls the PDU 6 to supply electric power charged in the battery 7 or electric power generated by the front motor 4 to the stator 42, the supplied electric power is converted to motive power to thereby rotate the rotor 43 (powering operation). In this case, the motive power of the rotor 43 is controlled according to the electric power supplied to the stator 42. Further, in a state in which the supply of electric power to the stator 42 is stopped and the rotor 43 is rotated by the input of the motive power, the motive power is converted to electric power, whereby electric power is generated (regenerative operation), and the generated electric power is charged to the battery 7.

The first planetary gear unit 51 is for transmitting motive power output from the first rear motor 41 to the left rear wheel WRL while reducing the speed thereof, and includes a first sun gear 52, a first ring gear 53, double pinion gears 54, and a first carrier 55. The first sun gear 52 is integrally formed with the above-mentioned rotating shaft 44, and rotates in unison with the rotor 43 of the first rear motor 41. The first ring gear 53 is integrally formed with a rotating shaft 81 which is hollow. The double pinion gears 54 each integrally include a first pinion gear 54*a* and a second pinion gear 54*b*, and the number of the double pinion gears 54 is three (only two of which are shown). Further, the double pinion gears 54 are rotatably supported by the first carrier 55, and the first pinion gear 54*a* and the second pinion gear 54*b* of each double pinion gear 54 are in mesh with the first sun gear 52 and the first ring gear 53, respectively. The first carrier 55 is integrally formed with the other end of the left rear drive shaft SRL, and rotates in unison with the left rear drive shaft SRL.

The second rear motor 61 and the second planetary gear unit 71 have the same construction as the above-described first rear motor 41 and the first planetary gear unit 51, so that hereafter, a brief description will be given of the construction of the second rear motor 61 and the second planetary gear unit 71. The second rear motor 61 and second planetary gear unit 71 and the first rear motor 41 and first planetary gear unit 51 are arranged symmetrically to each other with respect to a one-way clutch 83, referred to hereinafter. A stator 62 of the second rear motor 61 is fixed to the casing CA, and is electrically connected via the PDU 6 to the stator of the front motor 4, the battery 7, and the stator 42 of the first rear motor 41. Further, a rotor 63 of the second rear motor 61 is integrally formed with a rotating shaft 64 which is hollow, and the rotating shaft 64 is relatively rotatably provided outside a right rear drive shaft SRR.

In the second rear motor 61, when the ECU 2 controls the PDU 6 to supply electric power in the battery 7 or electric power generated by the front motor 4 to the stator 62, the supplied electric power is converted to motive power to thereby rotate the rotor 63 (powering operation). In this case, the motive power of the rotor 63 is controlled according to the electric power supplied to the stator 62. Further, in a state in which the supply of electric power to the stator 62 is stopped and the rotor 63 is rotated by the input of the motive power, the motive power is converted to electric power, whereby electric power is generated (regenerative operation), and the generated electric power is charged to the battery 7.

The second planetary gear unit 71 is for transmitting motive power from the second rear motor 61 to the right rear wheel WRR while reducing the speed thereof, and includes a second sun gear 72, a second ring gear 73, double pinion gears 74, and a second carrier 75. The second sun gear 72, the second ring gear 73, and the double pinion gears 74 are set to have the same number of gear teeth as those of the first sun gear 52, the first ring gear 53, and the double pinion gears 54, respectively.

The second sun gear 72 is integrally formed with the above-mentioned rotating shaft 64, and rotates in unison with the rotor 63 of the second rear motor 61. The second ring gear 73 is integrally formed with a rotating shaft 82 which is hollow. The rotating shaft 82 is opposed to the above-mentioned rotating shaft 81 in an axial direction with a slight gap therebetween. The double pinion gears 74 are rotatably supported by the second carrier 75, and a first pinion gear 74*a* and a second pinion gear 74*b* of each double pinion gear 74 are in mesh with the second sun gear 72 and the second ring gear 73, respectively. The second carrier 75 is integrally formed with the other end of the right rear drive shaft SRR, and rotates in unison with the left rear drive shaft SRR.

The rear wheel-driving device DRS further includes the one-way clutch 83 and a hydraulic brake 84. The one-way clutch 83 includes an inner race 83*a* and an outer race 83*b*, and is arranged between the first and second planetary gear units 51 and 71. Note that in the skeleton diagram in FIG. 2, the illustrated locations of the inner race 83*a* and the outer race 83*b* are opposite to the actual arrangement thereof in respect of the inside and outside locations, for convenience of illustration. The inner race 83*a* is spline-connected to the above-mentioned rotating shafts 81 and 82, whereby the inner race 83*a*, the rotating shafts 81 and 82, and the first and second ring gears 53 and 73 rotate in unison. Further, the outer race 83*b* is fixed to the case CA.

With the above arrangement, when motive power in a direction of causing the rotating shafts 81 and 82 to perform reverse rotation is transmitted to the rotating shafts 81 and 82, the one-way clutch 83 blocks the reverse rotation of the rotating shafts 81 and 82, and the first and second ring gears 53 and 73, by connecting the rotating shafts 81 and 82, to the case CA, whereas when motive power in a direction of causing the rotating shafts 81 and 82 to perform normal rotation is transmitted to the rotating shafts 81 and 82, the one-way clutch 83 allows the normal rotation of the rotating shafts 81 and 82, and the first and second ring gears 53 and 73, by disconnecting between the rotating shafts 81 and 82, and the case CA.

The hydraulic brake 84, which is formed by a multiplate clutch, is attached to the case CA and the rotating shafts 81 and 82, and is disposed radially outward of the first and second planetary gear units 51 and 71. The hydraulic brake 84 is controlled by the ECU 2 to selectively execute a braking operation for braking the first and second ring gears 53 and 73, and a rotation allowing operation for allowing rotation of the first and second ring gears 53 and 73. The braking force of the hydraulic brake 84 is controlled by the ECU 2.

Figure 3:
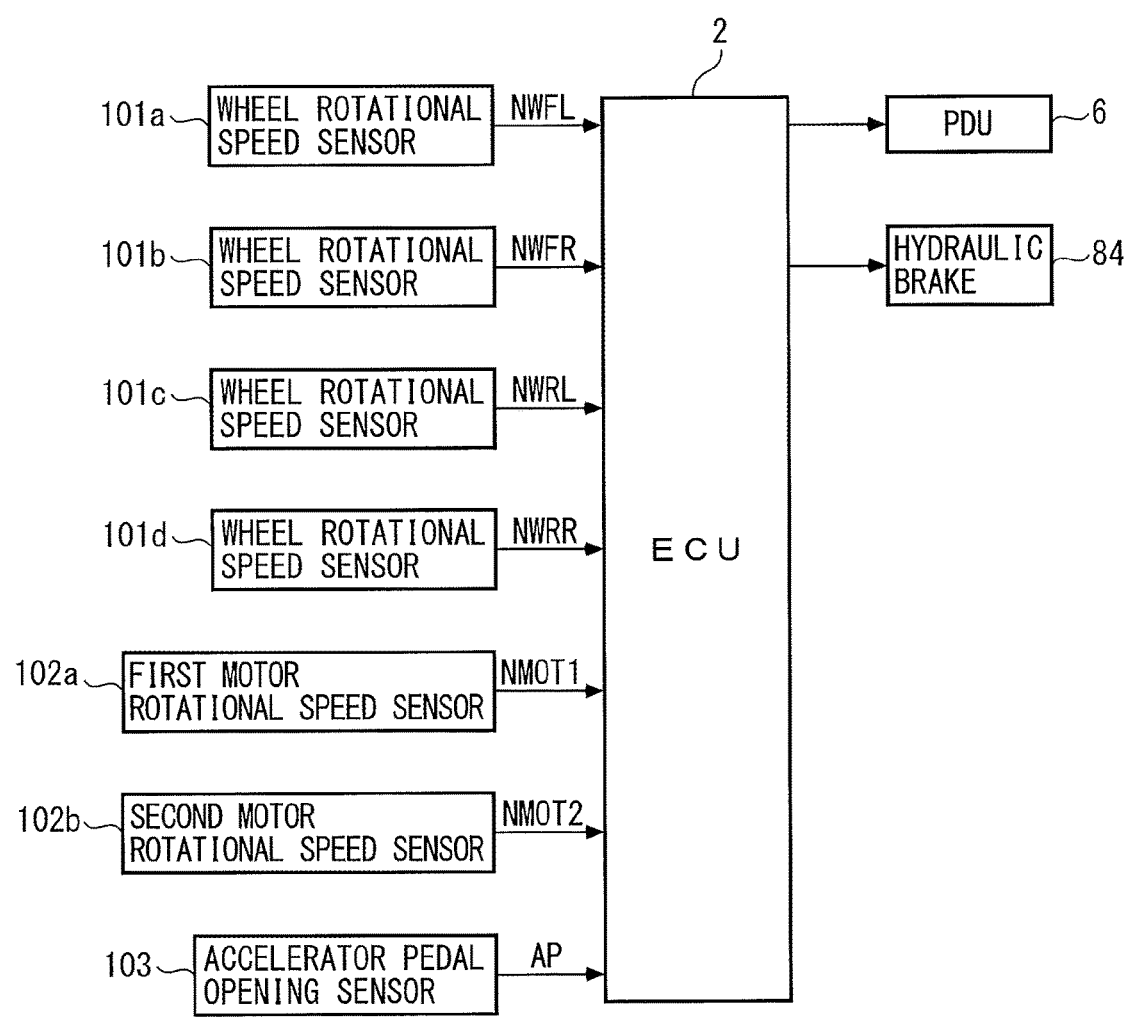
FIG. 3 A block diagram of the slip determination system.

As shown in FIG. 3, to the ECU 2, detection signals indicative of wheel rotational speeds NWFL, NWFR, NWRL, and NWRR, which are the respective rotational speeds of the left and right front wheels WFL and WFR, and the left and right rear wheels WRL and WRR, are input from wheel rotational speed sensors 101*a* to 101*d*. The ECU 2 calculates a speed VP of the vehicle V (vehicle speed) based on these detection signals and the diameter of the wheels W.

Further, to the ECU 2, detections signals indicative of first and second motor rotational speeds NMOT1 and NMOT2, which are rotational speeds of the rotor 43 and 63 of the first and second rear motors 41 and 61, are input from first and second motor rotational speed sensors 102*a* and 102*b*, respectively. Furthermore, to the ECU 2, a detection signal indicative of an accelerator pedal opening AP which is a stepped-on amount of an accelerator pedal (not shown) of the vehicle V is input from an accelerator pedal opening sensor 103.

The ECU 2 is implemented by a microcomputer comprised of an I/O interface, a CPU, a RAM, and a ROM. The ECU 2 calculates a demanded braking/driving force demanded of the vehicle V according to the detection signals from the above-mentioned various sensors 101 to 103, determines the operation mode of the front wheel-driving device DFS and the rear wheel-driving device DRS based on the calculated demanded braking/driving force and so forth, and calculates a demanded torque demanded for each wheel W. Then, the ECU 2 sets the respective target torques of the engine 3, the front motor 4, the first and second rear motors 41 and 61, based on the demanded torque, and controls the operations of these component elements based on the set target torques to thereby drive or brake the wheels W, and control the operation of the vehicle V. Note that in the present embodiment, the ECU 2 corresponds to threshold value-setting means, slip determining means, braking driving force-acquiring means, and threshold value-changing means.

The above-mentioned operation modes of the front wheel-driving device DES include an ENG traveling mode in which only the engine 3 is used as a motive power source of the vehicle V, an EV traveling mode in which only the front motor 4 is used as the motive power source, an assist traveling mode in which the engine 3 is assisted by the front motor 4, a charging traveling mode in which the battery 7 is electrically charged by the front motor 4 using part of the motive power output from the engine 3, a deceleration regeneration mode in which the battery 7 is electrically charged by the front motor 4 using traveling energy during deceleration traveling of the vehicle V, and so forth.

Further, the operation modes of the rear wheel-driving device DRS include a drive mode, a regeneration mode (braking) mode, and so forth. Hereafter, these operation modes will be sequentially described.

[Drive Mode]

The drive mode is an operation mode in which the powering operation is performed by the first and second rear motors 41 and 61 using electric power of the battery 7 e.g. during acceleration traveling of the vehicle V to thereby drive the left and right rear wheels WRL and WRR using the motive power converted from the electric power. In this drive mode, basically, target torques TROBJ of the first and second rear motors 41 and 61 are set to the same positive value. Then, electric power corresponding to the target torque TROBJ is supplied to the first and second rear motors 41 and 61 to thereby cause the rotors 43 and 63 to perform normal rotation, and the hydraulic brake 84 to brake the first and second ring gears 53 and 73, respectively.

As is clear from the above-described connection relationship between the various types of rotary elements of the rear wheel-driving device DRS, the first sun gear 52 is equal in rotational speed to the first rear motor 41 (rotor 43), and the first carrier 55 and the first ring gear 53 are equal in rotational speed to the left rear wheel WRL and the second ring gear 73, respectively. Further, the second sun gear 72 is equal in rotational speed to the second rear motor 61 (rotor 63), and the second carrier 75 is equal in rotational speed to the right rear wheel WRR. Further, as is widely known, the rotational speeds of the first sun gear 52, the first carrier 55, and the first ring gear 53 have a collinear relationship in which the rotational speeds are aligned in a single straight line in a collinear chart, and the rotational speeds of the first sun gear 52 and the first ring gear 53 are on the opposite sides of the first carrier 55. The above-mentioned relationship also applies to the second sun gear 72, the second carrier 75, and the second ring gear 73.

Figure 4:
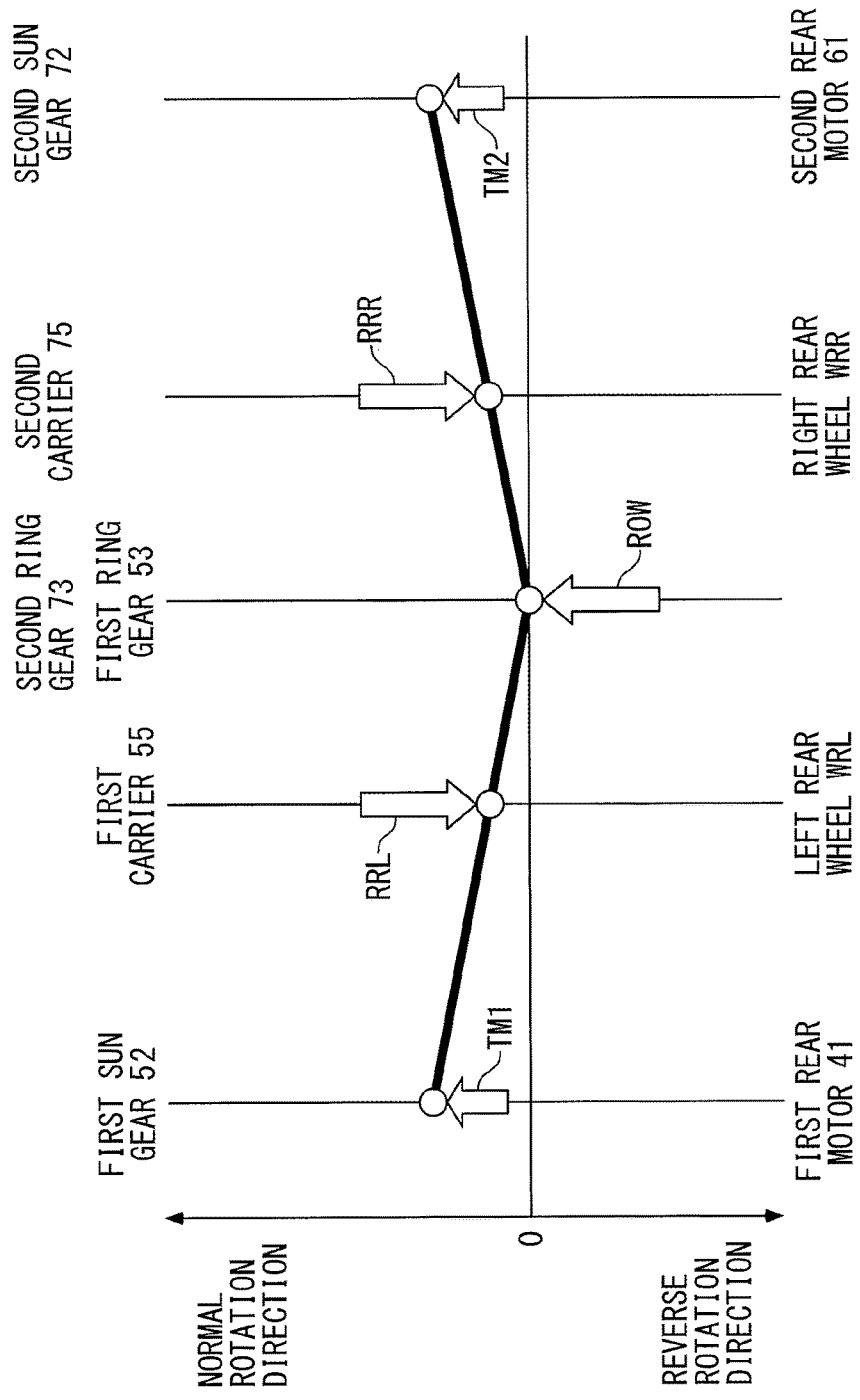
FIG. 4 A collinear chart showing a rotational speed relationship and a torque balance relationship between various types of rotary elements and left and right rear wheels in a drive mode of the rear wheel-driving device.

From the above, the relationship of the rotational speed between the various types of rotary elements expressed by the collinear chart shown in FIG. 4. Note that in the collinear chart in FIG. 4 and another collinear chart, referred to hereinafter, a distance from a horizontal axis indicating a value of 0 to a white circle on a vertical axis corresponds to the rotational speed of each rotary element. Further, in FIG. 4, TM1 represents an output torque of the first rear motor 41 (hereinafter referred to as the "first rear motor powering torque") generated by the powering operation, and TM2 represents an output torque of the second rear motor 61 (hereinafter referred to as the "second rear motor powering torque") generated by the powering operation. Further, RRL represents a reaction force torque of the left rear wheel, RRR represents a reaction force torque of the right rear wheel WRR, and ROW represents a reaction force torque of the one-way clutch 83.

As described above, the one-way clutch 83 is configured to block reverse rotation of the first and second ring gears 53 and 73. Further, as is clear from FIG. 4, the first rear motor powering torque TM1 acts to cause the first sun gear 52 to perform normal rotation, and cause the first ring gear 53 to perform reverse rotation. From the above, the first rear motor powering torque TM1 is transmitted to the left rear wheel WRL via the first carrier 55 and the left rear drive shaft SRL using the reaction force torque ROW of the one-way clutch 83 acting on the first ring gear 53 as a reaction force, so that the left rear wheel WRL is driven. Similarly, the second rear motor powering torque TM2 is transmitted to the right rear wheel WRR via the second carrier 75 and the right rear drive shaft SRR using the reaction force torque ROW of the one-way clutch 83 acting on the second ring gear 73 as a reaction force, so that the right rear wheel WRR is normally rotated.

[Regeneration Mode]

The regeneration mode is an operation mode for causing the first and second rear motors 41 and 61 to perform the regenerative operation using the traveling energy of the vehicle V e.g. during deceleration traveling of the vehicle V while braking the rear wheels WRL and WRR, and charging the generated electric power to the battery 7. In the regeneration mode, basically, the target torques TROBJ of the first and second rear motors 41 and 61 are set to the same negative value. The electric power regenerated by the first and second rear motors 41 and 61 is controlled according to the target torque TROBJ, and the first and second ring gears 53 and 73 are braked by the hydraulic brake 84.

Figure 5:
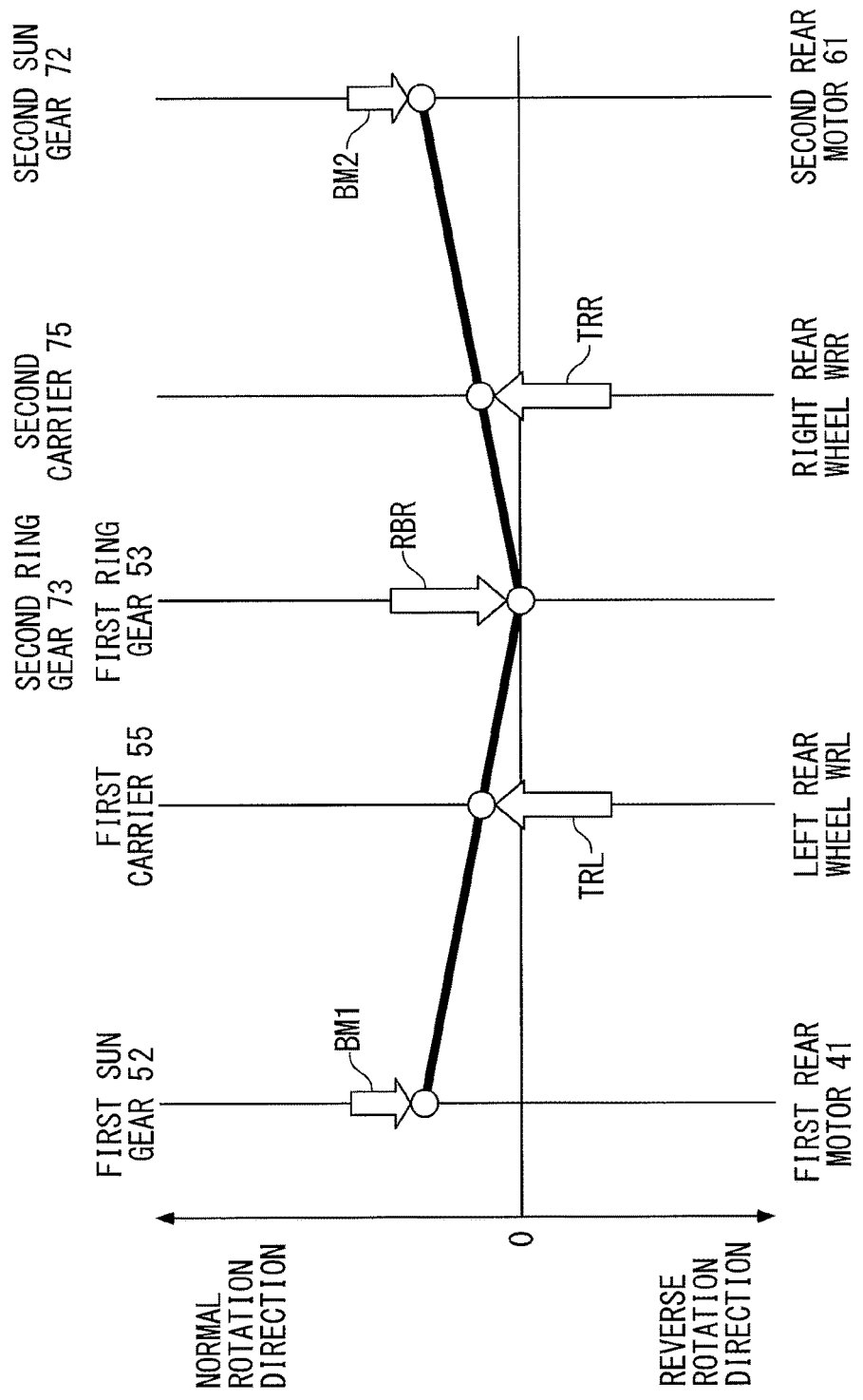
FIG. 5 A collinear chart showing a rotational speed relationship and a torque balance relationship between the various types of rotary elements and the left and right rear wheels, in a regeneration mode of the rear wheel-driving device.

FIG. 5 shows a rotational speed relationship and a torque balance relationship between the various types of rotary elements in the regeneration mode. In FIG. 5, BM1 represents an output (braking) torque of the first rear motor 41 generated by the regenerative operation (hereinafter referred to as the "first rear motor regeneration torque"), and BM2 represents an output (braking) torque of the second rear motor 61 generated by the regenerative operation (hereinafter referred to as the "second rear motor regeneration torque"). Further, TRL represents an inertia torque of the left drive wheel WRL, TRR represents an inertia torque of the right drive wheel WRR, and RBR represents a reaction force torque of the hydraulic brake 84.

As is clear from FIG. 5, the first and second rear motor regeneration torques BM1 and BM2 transmitted to the first and second sun gears 52 and 53, respectively, are transmitted to the first and second carriers 55 and 75, respectively, using the reaction force torque RBR of the hydraulic brake 84 as a reaction force, and are further transmitted to the left and right rear wheels WRL and WRR via the left and right rear drive shafts SRL and SRR, so that the left and right rear wheels WRL and WRR are braked.

Figure 6:
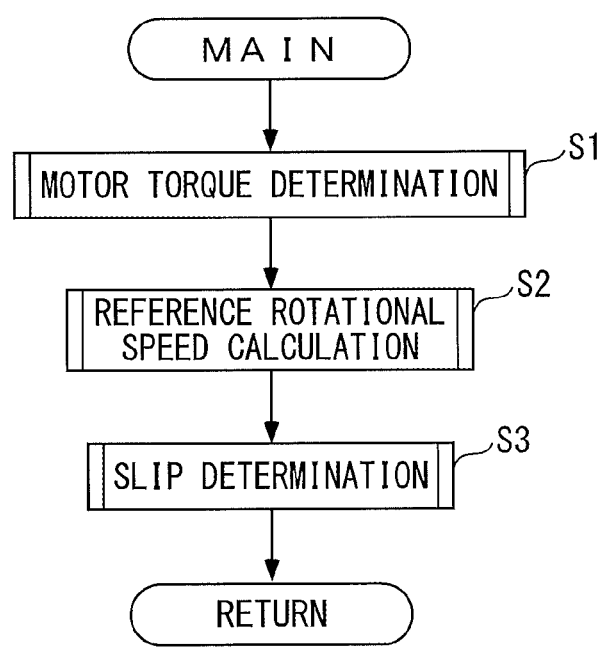
FIG. 6 A flowchart of a main flow of an excessive slip determination process.

Next, a description will be given of a slip determination process for determining excessive slip in the rear wheels WRL and WRR, according to a first embodiment of the present invention, with reference to FIGS. 6 to 9. The present process is repeatedly performed by the ECU 2 at a predetermined control period. FIG. 6 shows a main flow of the slip determination process. First, in a step 1 (shown as S1; similarly shown hereafter), a motor torque determination process is performed. The determination process is for determining inversion of the sign of the target torque TROBJ of the first and second rear motors (hereinafter referred to as the "rear motors" as deemed appropriate) 41 and 61.

Next, a process for calculating a reference rotational speed NMREF is performed (step 2). The reference rotational speed NMREF is used as a threshold value for determining occurrence of excessive slip which is slip in the rear wheels WRL and WRR, which is not smaller than a predetermined one. Next, a slip determination process is performed using the reference rotational speed NMREF calculated in the step 2 (step 3), followed by terminating the present process in FIG. 6.

Figure 7:
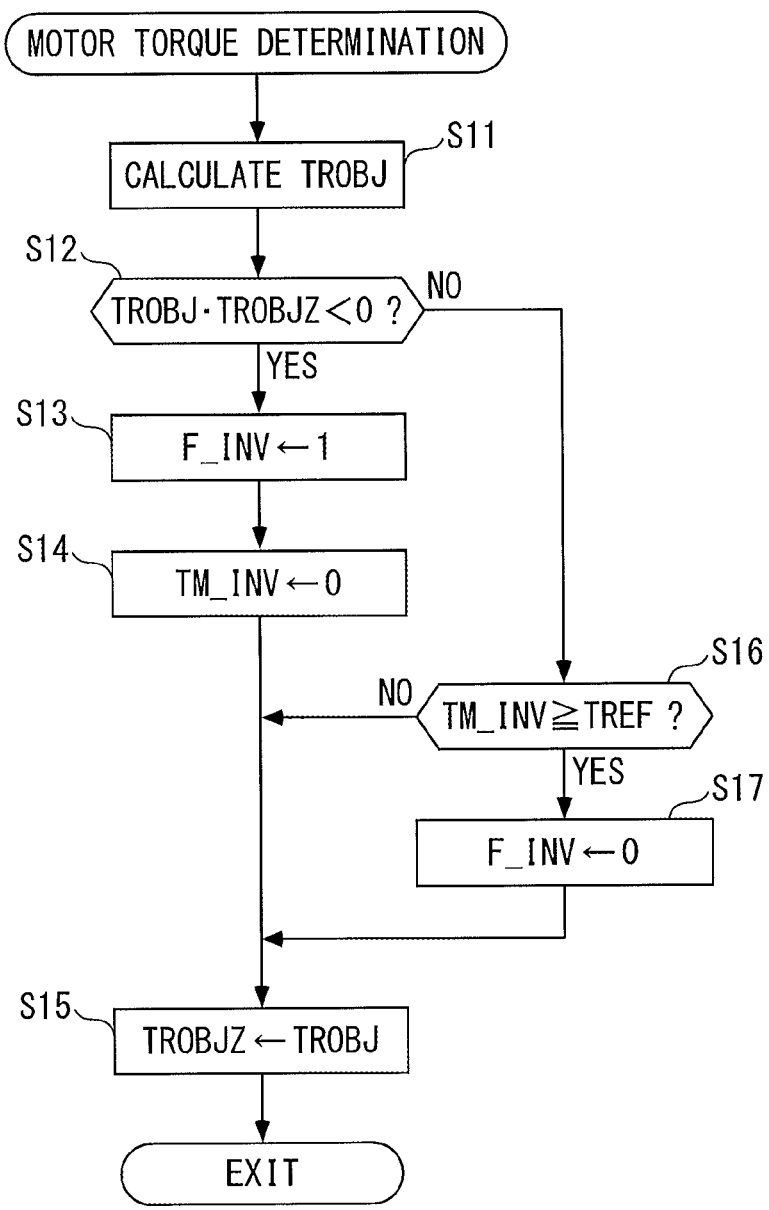
FIG. 7 A flowchart of a subroutine for a motor torque determination process.

FIG. 7 shows a subroutine for the above-mentioned motor torque determination process. In the present process, first, in a step 11, the target torque TROBJ of the rear motors 41 and 61 is calculated. As described above, the target torque TROBJ is set, based on the demanded torque demanded of the rear wheels WRL and WRR, to a positive value when the rear wheel-driving device DRS is in the drive mode, and a negative value when the rear wheel-driving device DRS is in the regeneration mode.

Next, it is determined whether or not a product of the calculated current target torque TROBJ and an immediately preceding value TROBJZ thereof is smaller than 0 (negative value) (step 12). If the answer to this question is affirmative (YES), i.e. if the sign of the current target torque TROBJ has been inverted from that of the immediately preceding value, that is, when the state of the rear motors 41 and 61 is being switched between the driving state and the braking state, to indicate the fact, a torque inversion flag F_INV is set to 1

(step 13). Further, a value TM_INV of a torque inversion timer of an up-counting type is reset to 0 (step 14), and the target torque TROBJ is shifted to the immediately preceding value TROBJZ (step 15), followed by terminating the present process.

If the answer to the question of the step 12 is negative (NO), i.e. if the sign of the target torque TROBJ has not been inverted, it is determined Whether or not the torque inversion timer value TM_INV reset in the step 14 is not shorter than a predetermined time period TREF (step 16). If the answer to this question is negative (NO), the process proceeds to the step 15, followed by terminating the present process.

On the other hand, if the answer to the question of the step 16 is affirmative (YES), i.e. if the predetermined time period TREF has elapsed after inversion of the sign of the target torque TROBJ, the torque inversion flag F_INV is reset to 0 (step 17), and then the step 15 is executed, followed by terminating the present process. As described above, the torque inversion flag F_INV is set to 1 until the predetermined time period TREF elapses after the sign of the target torque TROBJ is inverted. This time period is hereinafter referred to as the "inversion time period" of the sign of the target torque TROBJ.

Figure 8:
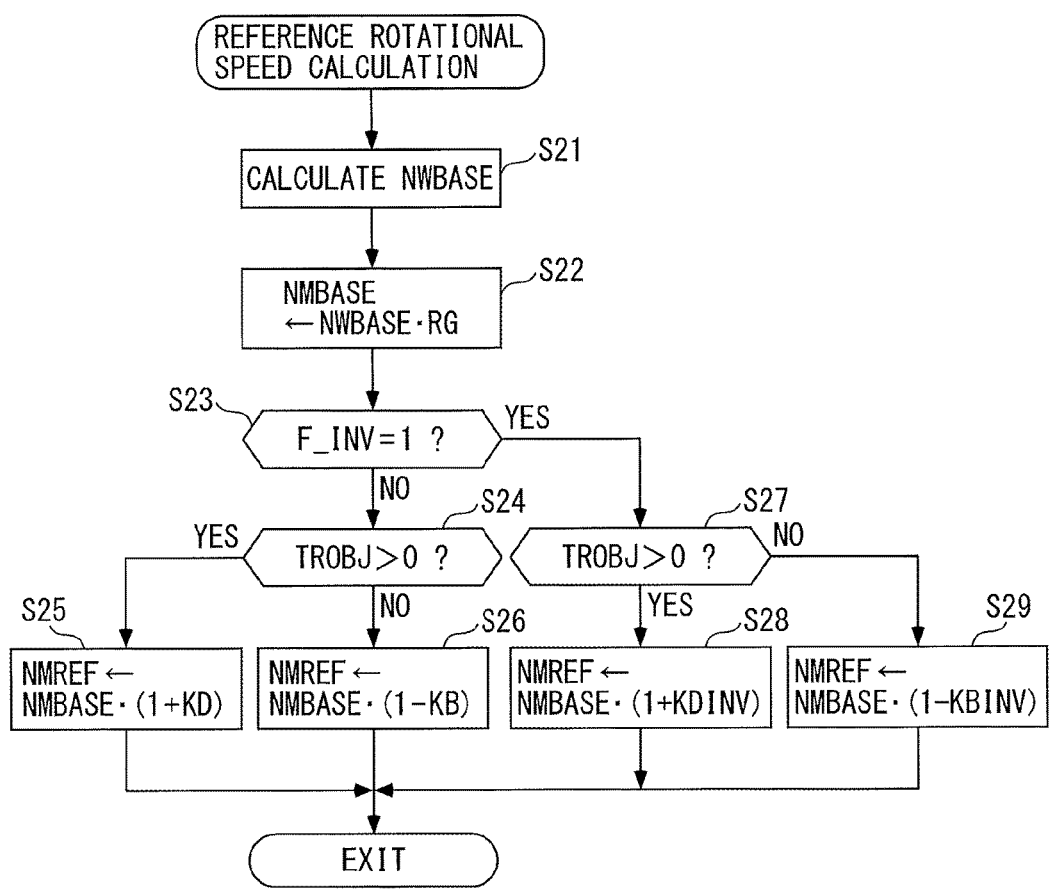
FIG. 8 A flowchart of a subroutine for a reference rotational speed calculation process according to a first embodiment.

Next, the process for calculating the reference rotational speed NMREF, executed in the step 2 in FIG. 6, will be described. FIG. 8 shows a subroutine for this process. In the present process, first, in a step 21, a basic value NWBASE of the wheel rotational speed is calculated. This basic value NWBASE is, for example, calculated as an average value of the detected four wheel rotational speeds NWFL, NWFR, NWRL, and NWRR.

Next, a basic value NMBASE of the motor rotational speed is calculated by multiplying the calculated basic value NWBASE of the wheel rotational speed by a predetermined transmission gear ratio RG (step 22). The transmission gear ratio RG corresponds to a transmission gear ratio from the first and second rear motors 41 and 61 to the left and right rear drive shafts SRL and SRR, i.e. a transmission gear ratio of the first and second planetary gear units 51 and 71. As is clear from the above, the basic value NMBASE of the motor rotational speed is obtained by converting the basic value NWBASE of the wheel rotational speed to a value corresponding to the rotational speed of the rear motors 41 and 61.

Next, it is determined whether or not the torque inversion flag F_INV is equal to 1 (step 23). If the answer to this question is negative (NO), i.e. if it is not during the inversion time period of the sign of the target torque TROBJ, it is determined whether or not the target torque TROBJ of the rear motors 41 and 61 is larger than 0 (step 24). If the answer to this question is affirmative (YES), i.e. when the rear wheels WRL and WRR are being normally driven by the rear motors 41 and 61, the reference rotational speed NMREF of the rear motors 41 and 61 is calculated by the following equation (1) based on the basic value NMBASE of the motor rotational speed calculated in the step 22 (step 25), followed by terminating the present process.

$$NMREF = NMBASE \cdot (1+KD) \quad (1)$$

In this equation, KD represents a predetermined margin coefficient for a normal driving time, and is set to a value between 0 and 1 ($0<KD<1$). Thus, in the normal driving state of the rear motors 41 and 61, the reference rotational speed NMREF is set to a larger value which is increased from the basic value NMBASE by a value corresponding to the margin coefficient KD.

On the other hand, if the answer to the question of the step 24 is negative (NO), i.e. when the rear wheels WRL and WRR are being normally braked by the rear motors 41 and 61, the reference rotational speed NMREF of the rear motors 41 and 61 is calculated by the following equation (2) (step 26), followed by terminating the present process.

$$NMREF = NMBASE \cdot (1-KB) \quad (2)$$

In this equation, KB represents a predetermined margin coefficient for a normal braking time, and is set to a value between 0 and 1 ($0<KB<1$). Thus, in the normal braking state of the rear motors 41 and 61, the reference rotational speed NMREF is set to a smaller value which is reduced from the basic value NMBASE by a value corresponding to the margin coefficient KB.

On the other hand, if the answer to the question of the step 23 is affirmative (YES), i.e. when it is during the inversion time period of the sign of the target torque TROBJ, similarly to the step 24, it is determined whether or not the target torque TROBJ of the rear motors 41 and 61 is larger than 0 (step 27). If the answer to this question is affirmative (YES), i.e. it is during the inversion time period in which the sign of the target torque TROBJ is inverted from negative to positive, and the rear motors 41 and 61 are changed from the braking state to the driving state, the reference rotational speed NMREF of the rear motors 41 and 61 is calculated by the following equation (3) (step 28), followed by terminating the present process.

$$NMREF = NMBASE \cdot (1+KDINV) \quad (3)$$

In this equation, KDINV represents a predetermined margin coefficient for a torque inversion/driving time, and is set to a value between 0 and 1, which is larger than the above-mentioned margin coefficient KD for the normal driving time ($0<KDINV<1$, $KDINV>KD$). As is clear from the above, in the inversion time period in which the sign of the target torque TROBJ is inverted from negative to positive, the reference rotational speed NMREF is set to a larger value than a value for the normal-driving time.

Further, if the answer to the question of the step 27 is negative (NO), i.e. when it is during the inversion time period in which the sign of the target torque TROBJ is inverted from positive to negative, and the state of the rear motors 41 and 61 is changed from the driving state to the braking state, the reference rotational speed NMREF of the rear motors 41 and 61 is calculated by the following equation (4) (step 29), followed by terminating the present process.

$$NMREF = NMBASE \cdot (1-KBINV) \quad (4)$$

In this equation, KBINV represents a predetermined margin coefficient for a torque inversion/braking time, and is set to a value between 0 and 1, which is larger than the above-mentioned margin coefficient KB for the normal braking time ($0<KBINV<1$, $KBINV>KB$). As is clear from the above, in the inversion time period in which the sign of the target torque TROBJ is inverted from positive to negative, the reference rotational speed NMREF is set to a smaller value than a value for the normal braking time.

Figure 9:
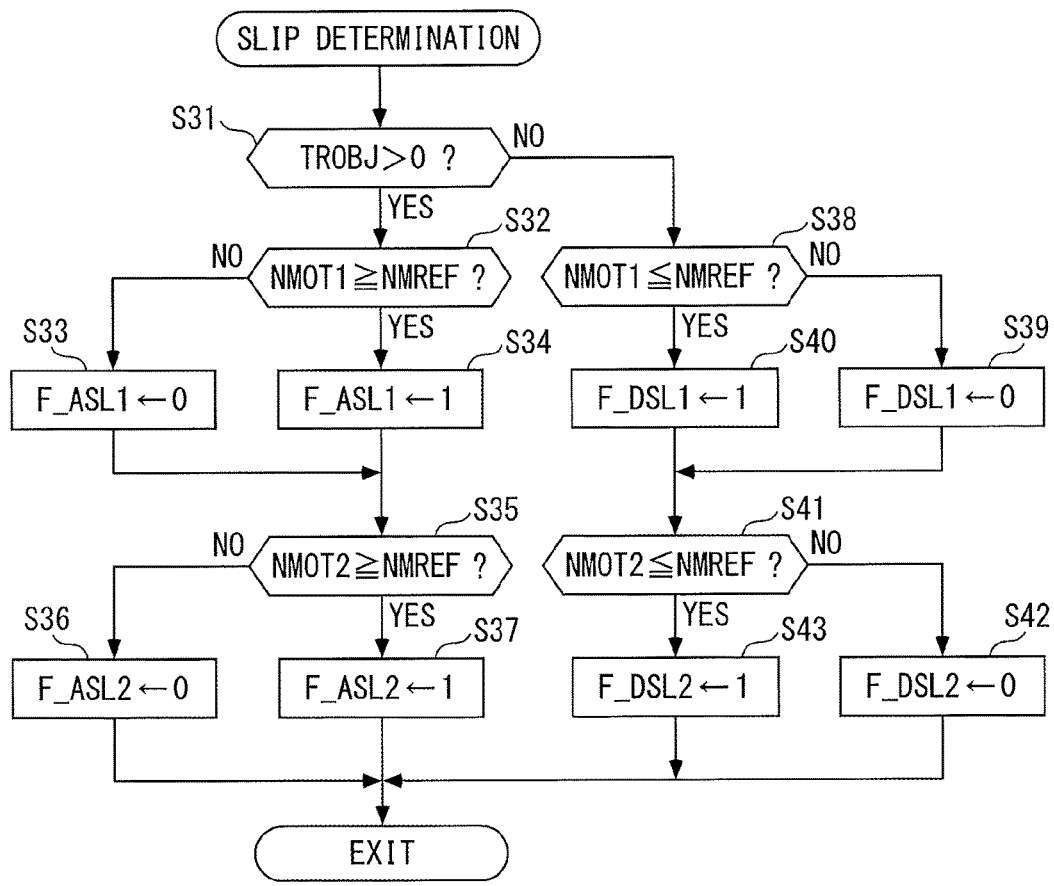
FIG. 9 A flowchart of a subroutine for a slip determination process according to the first embodiment.

Next, the slip determination process performed in the step 3 in FIG. 6 will be described. FIG. 9 shows a subroutine for the slip determination process. In the present process, first, in a step 31, it is determined whether or not the target torque TROBJ of the rear motors 41 and 61 is larger than 0. If the answer to this question is affirmative (YES), i.e. when the rear motors 41 and 61 are in the driving state, it is determined whether or not the first motor rotational speed NMOT1 which is the detected rotational speed of the first rear motor 41 is not lower than the reference rotational speed NMREF calculated in the step 25 or 28 in FIG. 8 (step 32).

If the answer to the question of the step 32 is negative (NO), i.e. if the first motor rotational speed NMOT1 does not reach the reference rotational speed NMREF, it is determined that acceleration slip (excessive slip not smaller than a predetermined one during acceleration) has not occurred in the left rear wheel WRL, and to indicate the fact, an acceleration slip flag F_ASL1 for the left rear wheel WRL is set to 0 (step 33).

On the other hand, if the answer to the question of the step 32 is affirmative (YES), i.e. if the first motor rotational speed NMOT1 is not lower than the reference rotational speed NMREF, it is determined that acceleration slip has occurred in the left rear wheel WRL, and to indicate the fact, the acceleration slip flag F_ASL1 for the left rear wheel WRL is set to 1 (step 34).

In steps 35 to 37 following the step 33 or 34, occurrence of acceleration slip in the right rear wheel WRR is determined by the same method as described above. First, in the step 35, it is determined whether or not the second motor rotational speed NMOT2 which is the detected rotational speed of the second rear motor 61 is not lower than the reference rotational speed NMREF.

If the answer to the question of the step 35 is negative (NO), i.e. if the second motor rotational speed NMOT2 does not reach the reference rotational speed NMREF, it is determined that acceleration slip has not occurred in the right rear wheel WRR, and an acceleration slip flag F_ASL2 for the right rear wheel WRR is set to 0 (step 36), followed by terminating the present process.

If the answer to the question of the step 35 is affirmative (YES), i.e. if the second motor rotational speed NMOT2 is not lower than the reference rotational speed NMREF, it is determined that acceleration slip has occurred in the right rear wheel WRR, and the acceleration slip flag F_ASL2 for the right rear wheel WRR is set to 1 (step 37), followed by terminating the present process.

On the other hand, if the answer to the question of the step 31 is negative (NO), i.e. if the rear motors 41 and 61 are in the braking state, it is determined whether or not the first motor rotational speed NMOT1 is not higher than the reference rotational speed NMREF calculated in the step 26 or 29 in FIG. 8 (step 38).

If the answer to the question of the step 38 is negative (NO), i.e. if the first motor rotational speed NMOT1 does not reach the reference rotational speed NMREF, it is determined that deceleration slip (excessive slip not smaller than a predetermined one during deceleration) has not occurred in the left rear wheel WRL, and to indicate the fact, a deceleration slip flag F_DSL1 for the left rear wheel WRL is set to 0 (step 39).

On the other hand, if the answer to the question of the step 38 is affirmative (YES), i.e. if the first motor rotational speed NMOT1 is not higher than the reference rotational speed NMREF, it is determined that deceleration slip has occurred in the left rear wheel WRL, and to indicate the fact, the deceleration slip flag F_DSL1 for the left rear wheel WRL is set to 1 (step 40).

In steps 41 to 43 following the step 39 or 40, occurrence of deceleration slip in the right rear wheel WRR is determined by the same method as described above. First, in the step 41, it is determined whether or not the second motor rotational speed NMOT2 is not higher than the reference rotational speed NMREF.

If the answer to the question of the step 41 is negative (NO), i.e. if the second motor rotational speed NMOT2 does not reach the reference rotational speed NMREF, it is determined that deceleration slip has not occurred in the right rear wheel WRR, and a deceleration slip flag F_DSL2 for the right rear wheel WRR is set to 0 (step 42), followed by terminating the present process.

On the other hand, if the answer to the question of the step 41 is affirmative (YES), i.e. if the second motor rotational speed NMOT2 is not higher than the reference rotational speed NMREF, it is determined that deceleration slip has occurred in the right rear wheel WRR, and the deceleration slip flag F_DSL2 for the right rear wheel WRR is set to 1 (step 43), followed by terminating the present process.

Figure 10:
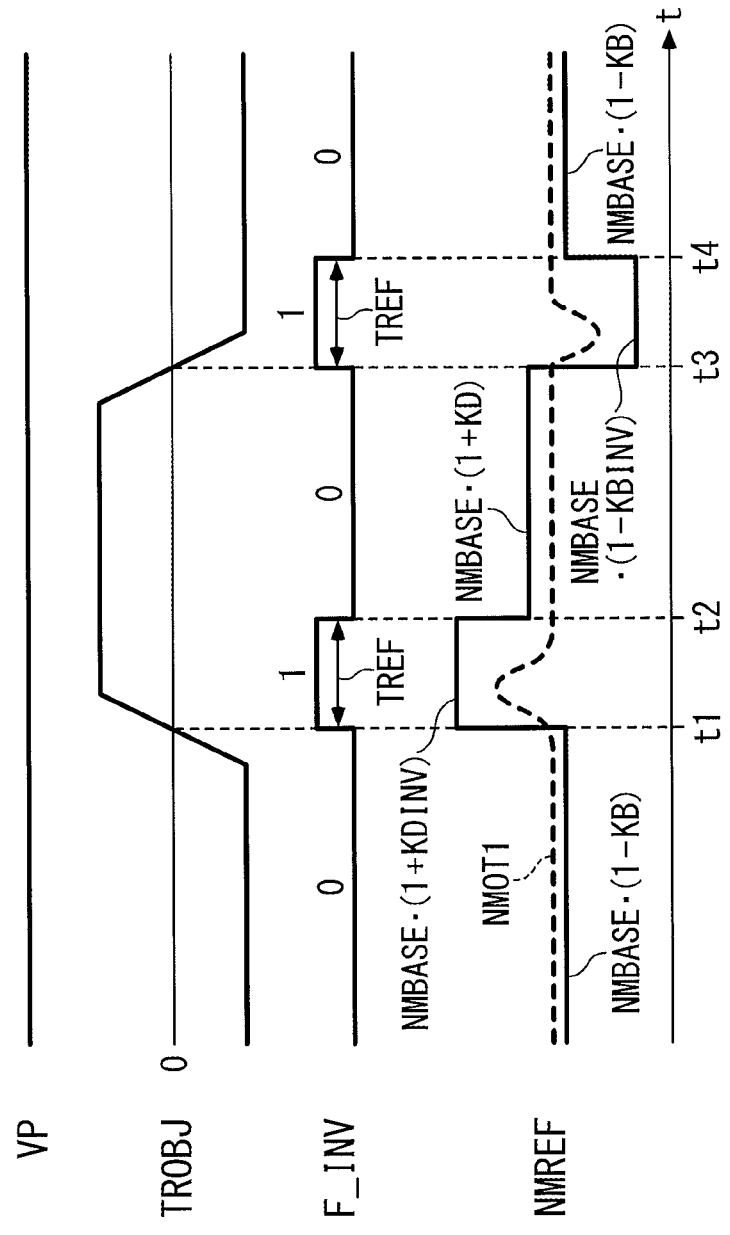
FIG. 10 A timing diagram showing an example of operation obtained by performing the processes in FIGS. 6 to 9.

Next, a description will be given of an example of operation obtained by performing the excessive slip determination process described heretofore with reference to FIG. 10. FIG. 10 shows a case where the state of the rear motors 41 and 61 is switched from the driving state to the braking state, and further switched from the braking state to the driving state in a state in which the vehicle speed V is constant.

Before a time point t1 in FIG. 10, the rear motors 41 and 61 are in the braking state, and the target torque TROBJ is set to a negative value. Therefore, the torque inversion flag F_INV is set to 0, and the reference rotational speed NMREF is set to the value for the normal braking time (=NMBASE·(1−KB)) (step 26 in FIG. 8).

When the state of the rear motors 41 and 61 is switched from the braking state to the driving state, and the sign of the target torque TROBJ is inverted from negative to positive, crossing 0 (time point t1), the torque inversion flag F_INV is set to 1 (step 13 in FIG. 7), and accordingly, the reference rotational speed NMREF is changed to a larger value for the torque inversion/driving time (=NMBASE·(1+KDINV)) (step 28 in FIG. 8). This state is maintained until the inversion time period elapses (time point t2).

Therefore, as indicated by a broken line in FIG. 10, even when the first motor rotational speed NMOT1 is temporarily increased e.g. due to backlash clogging occurring in the meshed portions of the first sun gear 52, the double pinion gears 54, and the first ring gear 53 of the first planetary gear unit 51 arranged between the first rear motor 41 and the left rear drive shaft SRL during the inversion time period of the target torque TROBJ, the first motor rotational speed NMOT1 does not reach the changed larger reference rotational speed NMREF. This prevents the answer to the question of the step 32 in FIG. 9 from erroneously becoming affirmative.

After that, when the inversion time period has elapsed (after t2), the torque inversion flag F_INV is reset to 0 (step 17 in FIG. 7), and accordingly, the reference rotational speed NMREF is returned to the smaller value for the normal driving time (=NMBASE·(1+KD)) (step 25 in FIG. 8).

When the state of the rear motors 41 and 61 is switched from this driving state to the braking state, and the sign of the target torque TROBJ is inverted from positive to negative, crossing 0 (time point t3), the torque inversion flag F_INV is set to 1 again (step 13 in FIG. 7), and accordingly, the reference rotational speed NMREF is changed to a smaller value for the torque inversion/braking time (=NMBASE·(1−KBINV)) (step 29 in FIG. 8). This state is maintained until the inversion time period elapses (time point t4).

Therefore, as indicated by a broken line in FIG. 10, even when the first motor rotational speed NMOT1 is temporarily reduced e.g. due to backlash clogging occurring between the first rear motor 41 and the left rear drive shaft SRL during the inversion time period of the target torque TROBJ, the first motor rotational speed NMOT1 does not reach the changed smaller reference rotational speed NMREF. This prevents the answer to the question of the step 38 in FIG. 9 from erroneously becoming affirmative.

After that, when the inversion time period has elapsed (after t4), the torque inversion flag F_INV is reset to 0, and accordingly, the reference rotational speed NMREF is returned to the larger value for the normal braking time (=NMBASE·(1−KB)) (step 26 in FIG. 8).

As described above, according to the present embodiment, when the state of the rear motors 41 and 61 is switched from the braking state to the driving state, and accordingly, the sign of the target torque TROBJ is inverted from negative to positive, the reference rotational speed NMREF which is the threshold value for determining acceleration slip is changed to the value for the torque inversion/driving period (=NMBASE·(1+KDINV)), which is larger than the value for the normal driving time. On the other hand, when the state of the rear motors 41 and 61 is switched from the driving state to the braking state, and accordingly, the sign of the target torque TROBJ is inverted from positive to negative, the reference rotational speed NMREF which is the threshold value for determining deceleration slip is changed to the value for the torque inversion braking time (=NMBASE·(1−KBINV)) which is smaller than the value for the normal braking time.

By setting and changing the reference rotational speed NMREF as described above, when the state of the rear motors 41 and 61 is switched between the driving state and the braking state, even if the first motor rotational speed NMOT1 and/or the second motor rotational speed NMOT2 is/are temporarily increased or reduced e.g. due to backlash clogging, the first motor rotational speed NMOT1 and/or the second motor rotational speed NMOT2 is/are prevented from reaching the reference rotational speed NMREF. As a result, it is possible to positively avoid erroneous determination of acceleration slip and deceleration slip, and thereby improve the accuracy of excessive slip determination.

Next, a description will be given of a second embodiment of the present invention with reference to FIGS. 11 and 12. Although in the first embodiment, when the sign of the target torque TROBJ of the rear motors 41 and 61 is inverted, the reference rotational speed NMREF is changed, the second embodiment differs from the first embodiment in that slip determination is inhibited in the same situation.

Figure 11:
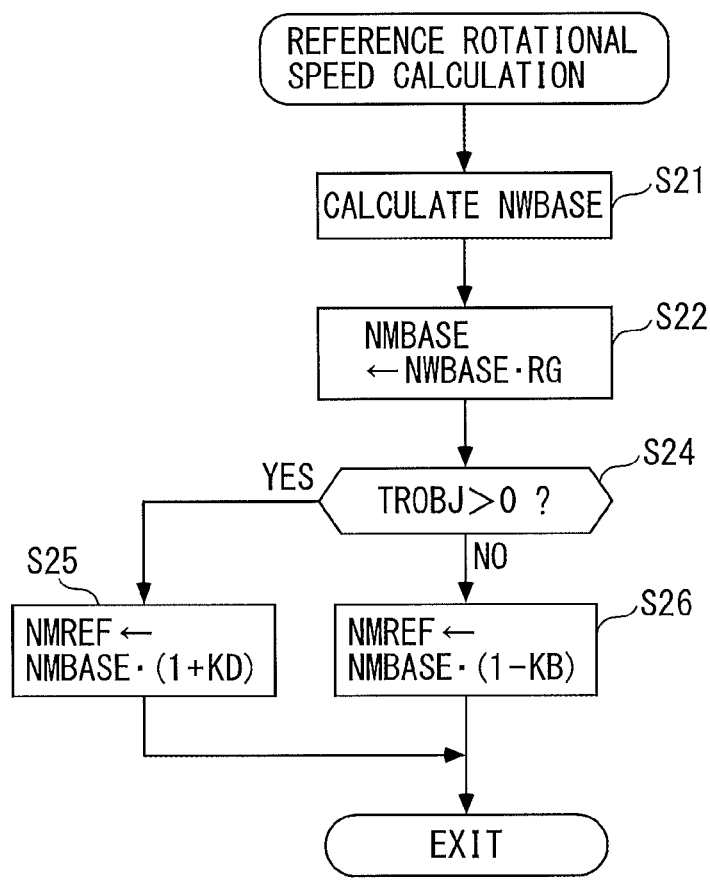
FIG. 11 A flowchart of a subroutine for a reference rotational speed calculation process according to a second embodiment.
Figure 12:
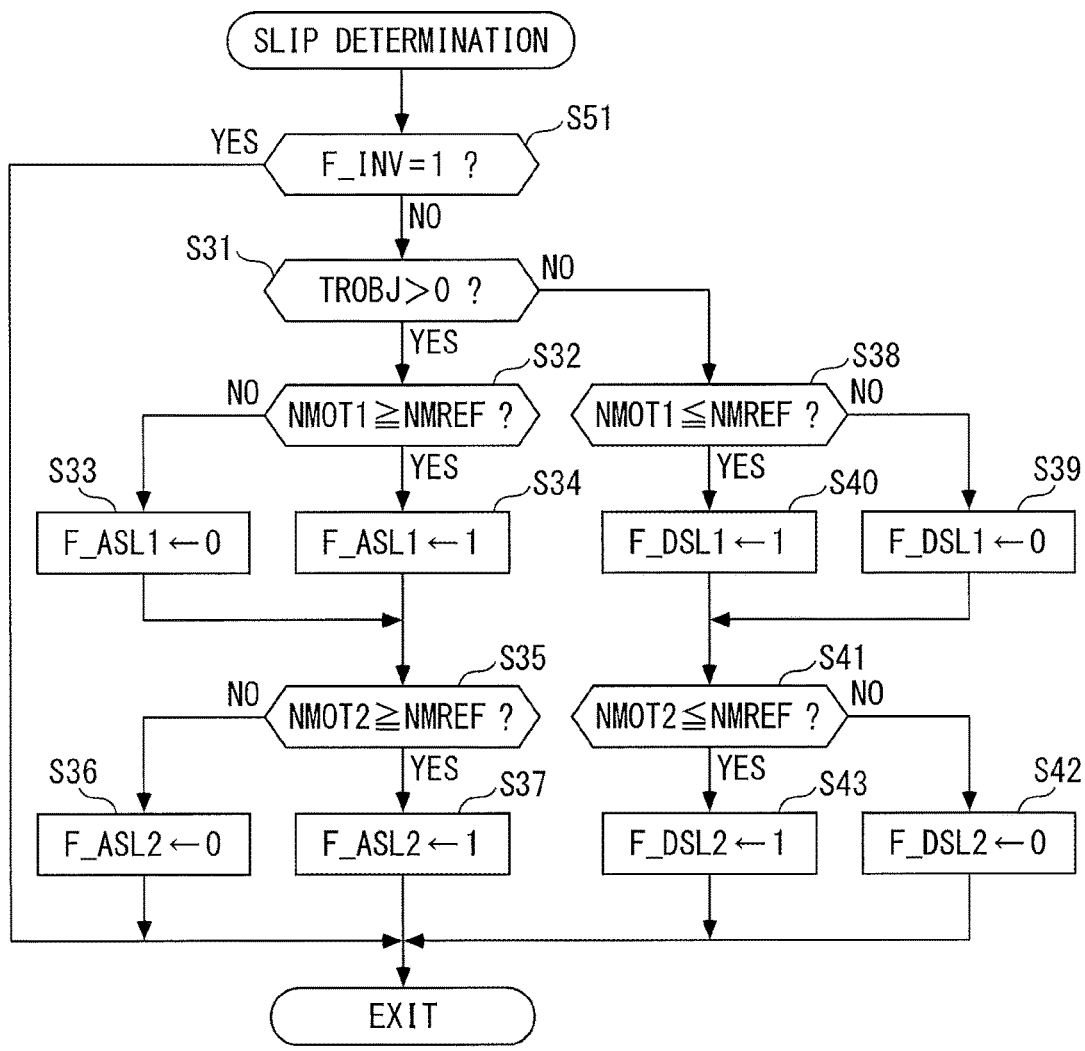
FIG. 12 A flowchart of a subroutine for a slip determination process according to the second embodiment.

FIGS. 11 and 12 show subroutines for a reference rotational speed calculation process and a slip determination process, which are executed in place of the processes in FIGS. 8 and 9 in the first embodiment, respectively. In FIGS. 11 and 12, the same steps as those in FIGS. 8 and 9 are denoted by the same step numbers. The following description is given mainly of different points from the first embodiment.

In the reference rotational speed calculation process in FIG. 11, first, in steps 21 and 22, the basic value NWBASE of the wheel rotational speed is calculated, and the basic value NMBASE of the motor rotational speed is calculated, similarly to the process in FIG. 8. Next, it is determined whether or not the target torque TROBJ of the rear motors 41 and 61 is larger than 0 (step 24).

If the answer to the question of the step 24 is affirmative (YES), i.e. when the rear motors 41 and 61 are in the driving state, the reference rotational speed NMREF for the driving time is calculated by the above equation (1) using the basic value NMBASE (step 25). Further, if the answer to the question of the step 24 is negative (NO), i.e. when the rear motors 41 and 61 are in the braking state, the reference rotational speed NMREF for the braking time is calculated by the above equation (2) (step 26), followed by terminating the present process.

In the slip determination process in FIG. 12, first, in a step 51, it is determined whether or not the torque inversion flag F_INV is equal to 1. If the answer to this question is affirmative (YES), i.e. when it is during the sign inversion time period of the target torque TROBJ, the present process is immediately terminated. That is, in this case, slip determination using the reference rotational speed NMREF is inhibited, and hence slip determination is not performed.

On the other hand, the answer to the question of the step 51 is negative (NO), i.e. when it is not during the sign inversion time period of the target torque TROBJ, quite similarly to the process in FIG. 9, by executing the steps 31 to 43, the first and second motor rotational speeds NMOT1 and NMOT2 are compared with the reference rotational speed NMREF, according to the positive or negative sign of the target torque TROBJ, whereby occurrence of acceleration slip and deceleration slip is determined with respect to each of the left and right rear wheels WRL and WRR.

As described above, according to the present embodiment, when the sign of the target torque TROBJ of the rear motors 41 and 61 is inverted, excessive slip determination is inhibited. As a consequence, even if the first and second motor rotational speeds NMOT1 and NMOT2 are temporarily increased or reduced e.g. due to backlash clogging when the driving/braking state of the rear motors 41 and 61 is switched, it is possible to positively avoid erroneous determination caused by the influence of the temporarily increased or reduced motor rotational speed, and thereby improve the accuracy of excessive slip determination.

Note that the present invention is by no means limited to the embodiments described above, but can be practiced in various forms. For example, in the embodiments, the first and second motor rotational speeds NMOT1 and NMOT2 are used as the wheel speed parameters in the present invention, the wheel rotational speeds NWFL, NWFR, NWRL, and NWRR of the four wheels W are used as the basic speed parameters, the reference rotational speed NMREF obtained by converting the basic value NWBASE of the wheel rotational speed, which is the average value of the above-mentioned wheel rotational speeds, to a value corresponding to the motor rotational speed is used as the threshold value, and excessive slip determination is performed by comparing the first and second motor rotational speeds NMOT1 and NMOT2 with the reference rotational speed NMREF.

The present invention is not limited to this, but for example, excessive slip determination may be performed by converting the first and second motor rotational speeds NMOT1 and NMOT2 to values each corresponding to the wheel rotational speed, and comparing the converted values with a threshold value based on the wheel rotational speed, which is calculated e.g. based on the basic value NWBASE of the wheel rotational speed of the present embodiments.

Alternatively, it is possible to use the wheel rotational speeds NWRL and NWRR of the left and right wheels WRL and WRR as the wheel speed parameters, calculate a threshold value based on the four wheel rotational speeds NWFL, NWFR, NWRL, and NWRR as the basic speed parameters, and compare the wheel rotational speeds NWRL and NWRR with the calculated threshold value. Further, as the basic speed parameters, only the wheel rotational speeds NWFL and NWFR of the front wheels WRL and WFR may be used without using the wheel rotational speeds NWRL and NWRR of the rear wheels WRL and WRR, or the speed of the vehicle V (vehicle speed), which is separately calculated, may be used in place of or in combination with these wheel rotational speeds.

Further, although the vehicle V of the embodiments is configured such that the left and right rear wheels WRL and WRR are braked and driven by the left and right rear motors 41 and 61, respectively, the present invention is not limited to this, but can be applied to any other vehicle insofar as the wheels are braked and driven by a motor, and therefore, the present invention can be applied to a case where the rear wheels WRL and WRR are braked and driven by a single motor.

Alternatively, the present invention can also be applied to a case where the engine and the motor are provided on the rear wheel side, and a motor capable of generating electric power is provided on the front wheel side, with arrangement of the front and rear sides reverse to that of the embodiments. Further, another vehicle driving system for driving wheels can be configured as desired except the provision of the motor capable of generating electric power, and the vehicle may be one in which a drive source of the vehicle driving device is formed by the engine alone or the motor alone, or may be one Without the other vehicle driving system. In a case where the front wheels and the rear wheels are braked and driven by the respective motors, the present invention can be applied to the front wheels and the rear wheels, respectively.

Further, in the embodiments, as the parameter indicative of the braking driving force of the motor, the target torque TRLOB of the rear motors 41 and 61 is used, and when the sign of the target torque is inverted from positive to negative or from negative to positive, the driving/braking state of the rear motors 41 and 61 is predicted to be switched and the reference rotational speed is changed. Instead of this, any other suitable parameter, for example, the torque of the rear motors 41 and 61 may be detected and used as the parameter indicative of the braking; driving force of the motor, and in this case, when the sign of the detected torque is inverted from positive to negative or from negative to positive, it may be determined that the driving/braking state of the rear motors 41 and 61 has been actually switched and the reference rotational speed may be changed according to the change.

Further, although in the embodiments, the target torques TROBJ of the rear motors 41 and 61 are set to the same value, the present invention is not limited to this, but can be applied to a case where different braking/driving forces are set for the rear motors 41 and 61, respectively. In this case, inversion of the sign of the braking/driving force, such as the target torque, is determined for each rear motor, and the reference rotational speed is Changed according to a result of the determination. It is to be further understood that various changes and modifications may be made without departing from the spirit and scope thereof.

REFERENCE SIGNS LIST

2 ECU (threshold value-setting means, slip determining means, braking/driving force-acquiring means, threshold value-changing means, determination inhibiting means)
41 first rear motor (motor)
61 second rear motor (motor)
101a to 101d wheel rotational speed sensor (basic speed parameter-acquiring means)
102a first motor rotational speed sensor (wheel speed parameter-acquiring means)
102b second motor rotational speed sensor (wheel speed parameter-acquiring means)
V hybrid vehicle (vehicle)
WRL left rear wheel (wheel)
WRR right rear wheel (wheel)
WFL left front wheel (other wheel)
WFR right front wheel (other wheel)
NMOT1 first motor rotational speed (wheel speed parameter)
NMOT2 second motor rotational speed (wheel speed parameter)
NWFL wheel rotational speed of left front wheel (basic speed parameter)
NWFR wheel rotational speed of right front wheel (basic speed parameter)
NWRL wheel rotational speed of left rear wheel (basic speed parameter)
NWRR wheel rotational speed of right rear wheel (basic speed parameter)
NMREF reference rotational speed (threshold value, second threshold value)
TROBJ target torque of rear motor (braking/driving force of motor)

The invention claimed is:

1. A slip determination system for a vehicle, for determining whether or not excessive slip which is slip not smaller than a predetermined one occurs in a wheel which is mechanically connected to a motor via a motive power transmission system having a backlash, and is driven or braked by the motor, comprising:
    wheel speed parameter-acquiring means for acquiring a wheel speed parameter indicative of a speed of one of the wheel and the motor;
    basic speed parameter-acquiring means for acquiring a basic speed parameter indicative of a speed of the vehicle;
    threshold value-setting means for setting a threshold value which serves as a reference for determination of the excessive slip, based on the acquired basic speed parameter;
    slip determining means for determining that the excessive slip has occurred in the wheel when the acquired wheel speed parameter reaches the set threshold value;
    braking/driving force-acquiring means for acquiring a braking/driving force of the motor for driving or braking the wheel; and
    threshold value-changing means for changing the threshold value to a second threshold value which is used at the time of an inversion of the braking/driving force, and which is more difficult to be reached by the wheel speed parameter than the threshold value, when the sign of the acquired braking/driving force of the motor is inverted.

2. A slip determination system for a vehicle, for determining whether or not excessive slip which is slip not smaller than a predetermined one occurs in a wheel which is mechanically connected to a motor via a motive power transmission system having a backlash, and is driven or braked by the motor, comprising:
    wheel speed parameter-acquiring means for acquiring a wheel speed parameter indicative of a speed of one of the wheel and the motor;
    basic speed parameter-acquiring means for acquiring a basic speed parameter indicative of a speed of the vehicle;

threshold value-setting means for setting a threshold value which servers as a reference for determination of the excessive slip, based on the acquired basic speed parameter;
slip determining means for determining that the excessive slip has occurred in the wheel when the acquired wheel speed parameter reaches the set threshold value;
braking/driving force-acquiring means for acquiring a braking/driving force of the motor for driving or braking the wheel; and
determination inhibiting means for inhibiting the determination of the excessive slip performed by the slip determining means when the sign of the acquired braking/driving force of the motor is inverted.

* * * * *